Dec. 5, 1967　　　　C. C. LAVAL, JR　　　　3,356,509
DRIED FRUIT TREATING PROCESS
Filed July 29, 1963　　　　　　　　　　4 Sheets-Sheet 1

CLAUDE C. LAVAL, JR.
INVENTOR

Huebner & Worrel
ATTORNEYS

Dec. 5, 1967  C. C. LAVAL, JR  3,356,509
DRIED FRUIT TREATING PROCESS
Filed July 29, 1963  4 Sheets-Sheet 2

CLAUDE C. LAVAL, JR.
INVENTOR

Huebner & Worrel
ATTORNEYS

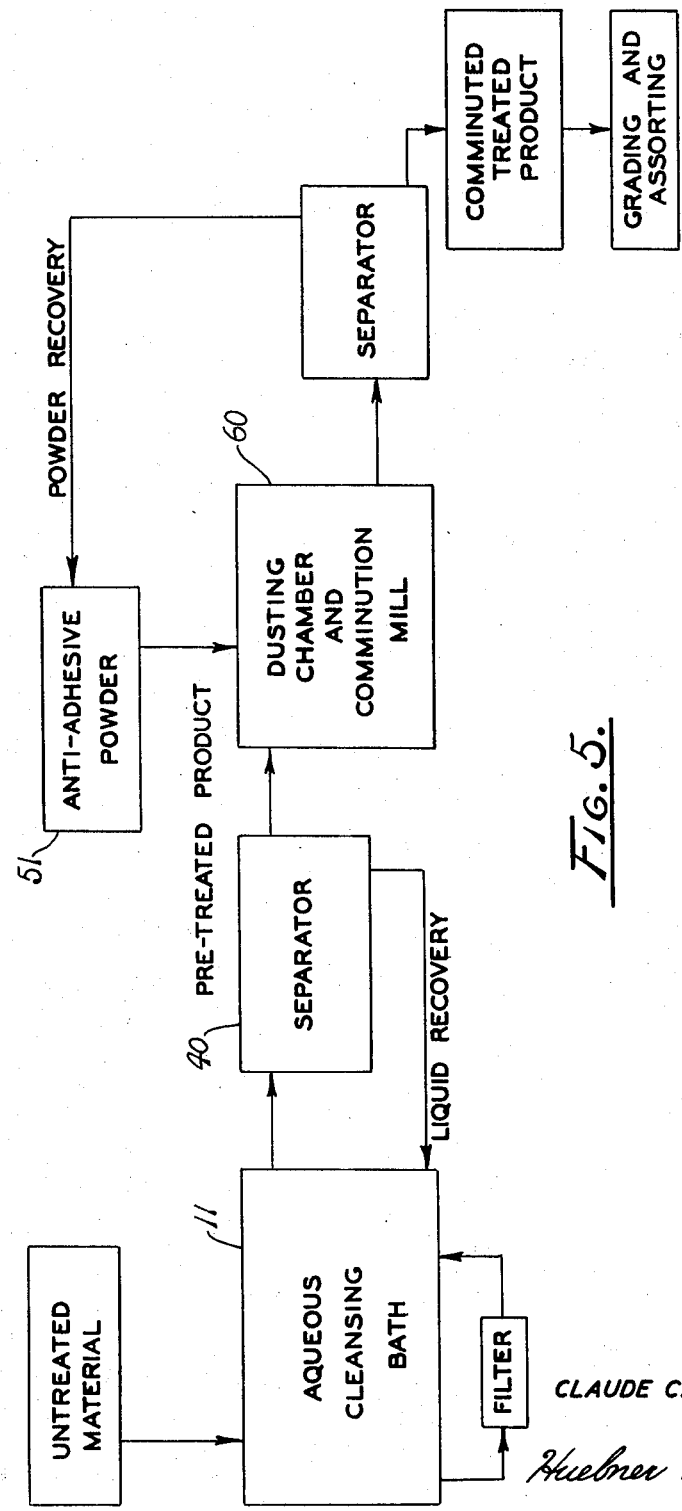

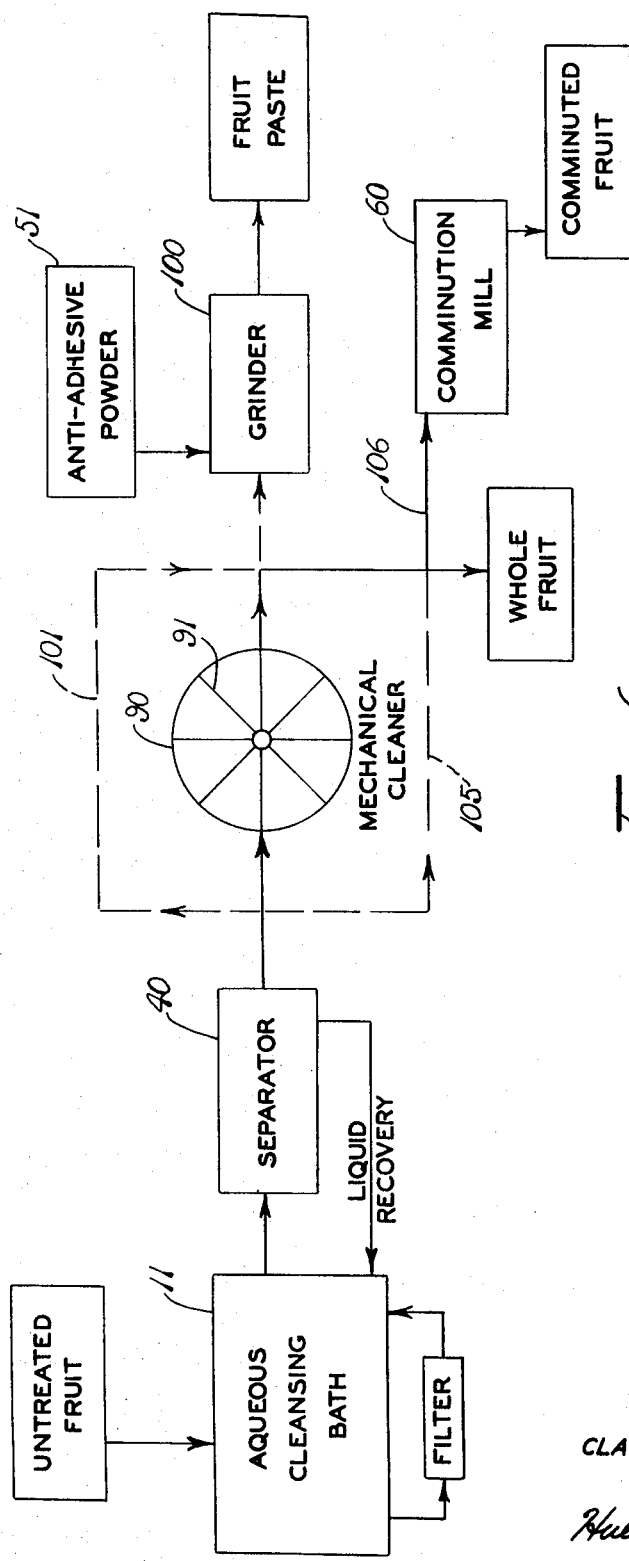

United States Patent Office 3,356,509
Patented Dec. 5, 1967

3,356,509
DRIED FRUIT TREATING PROCESS
Claude C. Laval, Jr., Fresno, Calif., assignor of one-fourth to Herbert A. Huebner, Hollywood, and one-fourth to Richard M. Worrel, Fresno, Calif.
Filed July 29, 1963, Ser. No. 298,357
13 Claims. (Cl. 99—154)

ABSTRACT OF THE DISCLOSURE

A dried food fruit product and a process for preparation of the same including immersion of dried fruit in an aqueous bath consisting essentially of water and an additive of a water soluble material selected from the group of organo-silicon oxide polymers in an amount to form an imperceptible film of the selected material on the treated fruit as a barrier to subsequent contamination, and loss of internal moisture, and agitating the fruit while in the bath sufficiently to dislodge surface impurities therefrom, and subsequently removing the products from the bath and the surface moisture therefrom while retaining the imperceptible film.

---

The present invention relates to a dried fruit treating process and product and more particularly to such a process involving the surface treatment of such fruits and particles thereof for cleansing; moisture retention; minimizing of stickiness; preservation; preconditioning for subsequent handling, storage, comminuting and like purposes; and/or to enhance flowability and to the product resulting from the practice of said process.

Many dride fruits, such as raisins, dates, peaches, figs, apricots, prunes, apples, pears, and the like are dried in a natural environment by simple field exposure to the sun so that surface impurities frequently accumulate in excess of the quantities tolerable under proper health considerations or permissible under existing governmental regulations relating to the distribution and sale of such food products. Certain of such surface impurities are readily removed by mechanical shaking and/or an aqueous bath, while others have been found to be practically impossible to remove, except by a mechanical abrasion in conjunction with some type of aqueous bath. The surfaces of such fruits are frequently sticky and prone to collect undesirable dirt and other impurities. Persistent forms of such surface impurities include various molds and surface growths quite similar in physical appearance. The term "mold" is employed in its popular sense, and includes true molds as are found on dried fruits, such as raisins, including Alternaria and related genera, Aspergillus, Penicellium, Botrytus, Oidium, and Unicinula, as well as simple decay which gives the appearance of mold.

Due to the tenacity of such molds and their deleterious effects upon the skin of dried fruits, particularly raisins, it has not been feasible prior to the present invention effectively to remove them in a manner permitting salvage of the fruit. When the mold is removed by conventional means, the flesh of the cleansed fruit is exposed in those areas previously covered by the mold. Consequently, such cleansed fruit has an aggravated tendency to adhere, due to the sticky, tacky character of the exposed flesh. As a result, the cleansed fruit is not free-flowing and normally is not considered to be of marketable quality.

Further, many food products ultimately intended for consumption by humans and/or animals are pre-cut into particles of a size less than the original unit, and packaged in such form prior to distribution and sale. With certain food products, such as dried fruits, it has been recognized as commercially desirable to market them in a chopped form or finely comminuted form even of such fineness as to appear as a paste. For descriptive convenience, the terms "comminuting" and "comminution" are employed herein for all chopping, cutting, grinding, grating and other operations employed by mechanical means to subdivide particles of food to a size less than their initial particle size.

Previously known methods of comminuting dried fruits have been largely unsuccessful because of the adherent characteristics of the fruit. Most dried fruits are characterized by surface stickiness, because of the exudation of sugar, and have flesh of even greater adherent properties. When the comminuting of such fruit is undertaken, the fruit tenaciously adheres to the mechanical means employed in the comminuting process and the individual particles of the comminuted fruit cohere. Further, such comminuted dried fruit tends to harden rapidly and become unusable as a food product.

Therefore, it is an object of the invention to provide an improved dried fruit treating process.

Another object is to provide a method for more effectively removing surface impurities from dried fruits.

Another object is to provide an imperceptible protective film for dried fruits which minimizes surface stickiness, improves the lubricity of such fruits even in instances in which the flesh is exposed, and imparts desirable flowability to the fruit.

Another object is to provide such a film which during application thoroughly cleanses the fruit.

Another object is to provide such a film which retains moisture in the dried fruit over protracted periods of storage.

Another object is to provide such a film which acts as a barrier to contamination.

Another object is to provide such a film which improves the appearance of the fruit but which is so thin as to be undetectable by visual means and virtually undetectable by normal laboratory means of chemical analysis.

Another object is to provide a process for the more effective comminution of dried fruit.

Another object is to precondition dried fruit for comminution by mechanical means so as to minimize or to prevent adherence of the resulting food particles to such mechanical means.

Another object is to provide a method of preconditioning and comminuting dried fruits and the like which minimizes or prevent adherence of the resulting particles to each other and results in a free-flowing end product.

Another object is to provide a dried fruit product of improved quality.

Another object is to provide a dried fruit product which remains free-flowing after protracted periods of storage.

Another object is to provide such a product consisting of finely subdivided fruit particles.

Another object is to provide a dried fruit product which maintains a sufficient moisture content for ready consumption over protracted periods of storage.

Another object is to provide such a product consisting of finely subdivided fruit particles.

Another object is to provide such a product in paste form.

A further object is to make possible the utilization of dried fruits, which heretofore have not been usable because of skin breakage, mold or other deterioration and have represented a substantial loss to producers of such foods.

These, together with other objects, will become more fully apparent upon reference to the following description and accompanying drawings.

In the drawings:

FIG. 5 is a flow diagram illustrative of the method of the present invention.

FIG. 6 is a flow diagram illustrative of alternative methods of practicing the present invention.

Figure 1:
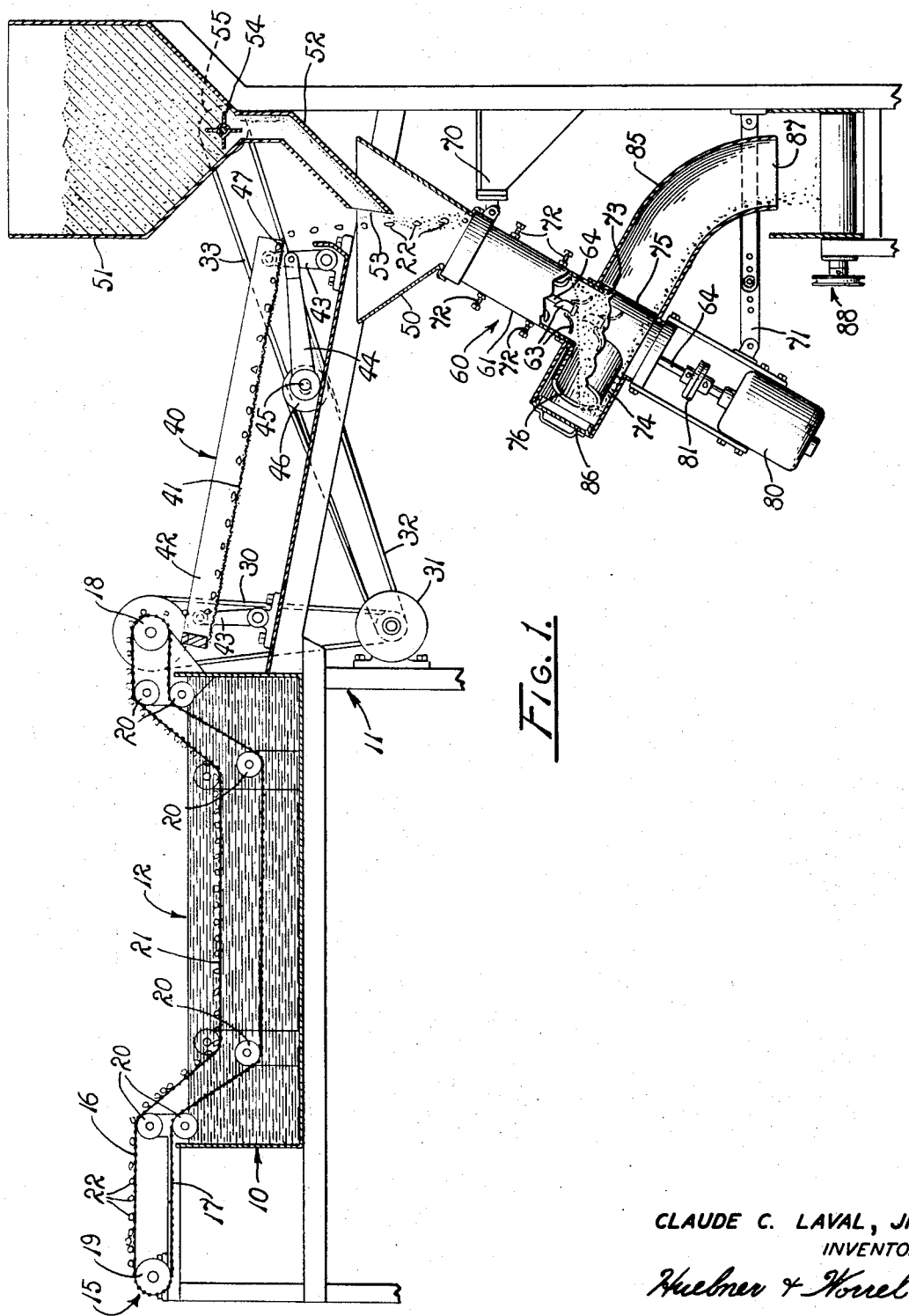
FIG. 1 is a view in side elevation, partly in vertical, longitudinal section, showing suitable apparatus for performing the method of the present invention.
Figure 3:
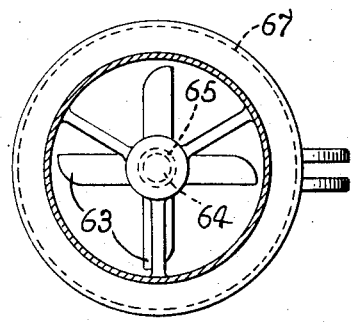
FIG. 3 is a transverse section taken on line 3—3 of FIG. 2.

Referring in greater particularity to FIG. 1, suitable apparatus for the practice of the present invention includes a conventional open-top tank 10 supported on a frame 11. The tank is adapted to contain an aqueous bath 12 which is employed to remove surface impurities from food products passing therethrough.

An endless conveyor 15 affords an elongated upper run 16 and a lower return run 17. The conveyor is trained about a drive roller 18 adjacent to the discharge end of the conveyor and an opposite idler roller 19, thereby affording an admission end for the conveyor. A plurality of intermediate rollers 20 are disposed and arranged to provide a submerged portion 21 of the upper run 16. The longitudinal limits of the submerged portion 21 are predetermined in relation to the rate of motivation of the conveyor 15, so that a predetermined immersion time is achieved.

Although adapted for use with a variety of food products, the present invention is conveniently described in connection with the treatment and comminution of a dried fruit, such as raisins. As illustrated in FIG. 1, a plurality of raisins 22 are deposited on the upper run 16 of the conveyor from a source, not shown. It will be appreciated that raisins dried in a natural environment and because of their surface stickiness unavoidably acquire undesirable amounts of surface impurities, all of which are objectionable for human consumption. This is true regardless of whether the raisins are intended to be consumed as whole units or comminuted prior to such consumption. Included in such undesirable surface impurities are the various molds and surface growths previously mentioned, and popularly referred to as mold, dust, insects, rodent droppings and the like.

The present invention involves the discovery that an aqueous bath containing an additive selected from the group of organo-silicon oxide polymers and generally referred to as silicone resins readily removes such surface impurities and achieves new and surprising surface conditioning of the fruit. Such silicone resins are well-known and broadly described in previously published literature such as the text "Introduction to the Chemistry of the Silicones" Eugene G. Rochow, John Wiley & Sons, Inc. New York, 1946, and as well as several patents, such as the patent to Hyde No. 2,371,050, entitled "Organo-Silicon Polymers and Method of Making Them." Silicone materials which are sold commercially give highly satisfactory results in the aqueous bath 12. Specific examples of such commercially available materials are "Dow Corning Antifoam AF Emulsion," Dow Corning Antifoam C Emulsion," and liquid silicones designated under the general classification of "Dow Corning 200 Fluid." The General Electric Company also markets silicone materials of substantially equivalent character, and all such silicones are commonly accepted herein as included within the general definition of organo-silicon oxide polymers.

A selected one of such silicone additives is added to the aqueous bath 12 in a rather minute amount, yet is effective to remove substantially all of the surface impurities on the raisins 22. The silicone additive has been found to be effective in concentrations as low as approximately 1 part per million. Even in such minute proportion, the silicone additive not only removes surface impurities, but forms an imperceptible protective film over dried fruit treated by the instant process even over the exposed flesh of any raisins previously affected by mold. Consequently, the cleansed raisins or other dried fruits are of a clean appearance, have virtually no tendency to adhere to each other, are free-flowing, and are totally unaffected insofar as nutritional value and flavor are concerned. Further, the film of silicone resin has been found to retain moisture in the dried fruit for protracted periods of storage, to resist contamination, and to minimize dust collection when exposed.

The upper limits of the quantity of silicone additive contained in the aqueous bath are determined in regard to economy and governmental regulations pertaining to preparation of food intended for consumption either by humans or animals. For example, the use of Dow-Corning Antifoam C Silicone Emulsion is permissible in amounts up to 33.3 parts per million as previously sanctioned by the Federal Food and Drug Administration. Accordingly, practical and legal consideration determine the upper limits of the proportions of silicone additive to the bath. Highly satisfactory results have been achieved with a concentration substantially less than the permissible abount of 33.3 parts per million, such as, for example, 3 parts per million, and even as low as the previously stated 1 part per million.

As an indication of the imperceptibility of the protective film afforded by the silicone additive in the aqueous bath, raisins treated in such a path have been subsequently analyzed from a qualitative point of view to determine the presence of silicone dioxide resulting from such treatment. The amount of silicone dioxide resulting from such treatment was not detectable until the bath concentration exceeded approximately 200 parts per million. Even at this relatively high concentration, which is far more than required to attain the full advantages of the present invention, the amount of silicone dioxide remaining on the raisins could not be accurately quantitatively determined nor its presence detected. Consequently, the protective film afforded by an aqueous bath containing such silicone additive provides a protective film which is virtually imperceptible using contemporary chemical analysis.

The temperature of the aqueous bath 12 is preferably maintained between the limits of 80° F. and 160° F. The longitudinal extent of the submerged portion 21 of the conveyor 15 is selected relative to the rate of travel of the conveyor so as to achieve an immersion duration for each of the raisins 22 ranging from a time of 240 seconds at a temperature of 80° F. to only 5 seconds at a temperature of 160° F. When the time and temperature relationship is adjusted within such parameters, highly satisfactory cleansing and treatment of the raisins is achieved in the aqueous bath 12, when constituted within the range of proportions set forth above. It is noted that prior to the present invention, it was regarded as impractical to treat raisins by immersion in an aqueous bath which was at a temperature appreciably in excess of 100° F.

A transmission belt 30 is arranged in driving relationship to the roller 18 to transmit power from a drive motor 31 mounted on the frame 11. Second and third transmission belts 32 and 33 are likewise powered by the motor 31.

The transmission belt 32 is arranged to operate a separator 40 of the mechanical shaker type and disposed in receiving relationship to the discharge end of the conveyor 15. The separator 40 is provided with a perforate receiving grid 41 mounted in a frame 42 and supported for oscillation by a pair of longitudinally spaced parallel links 43. Oscillatory movement is imparted to the frame 42 by means of a pitman arm 44 pivotally connected at one end to one of the links 43 and at the opposite end to an eccentric 45. The eccentric is driven by a pulley 46 about which is trained the transmission belt 32. The grid 41 is inclined at a suitable angle so that the raisins 22 deposited thereon gravitate toward a lower discharge end 47. Suitable recovery trays, not shown, normally are provided for collection and recovery of droplets of the bath 12 clinging to the raisins and separated therefrom during traversal of the separator 40. The magnitude of oscillation and the longitudinal limits of the separator are selected so as to shake substantially all of the bath from the raisins 22, except for the imperceptible protective film which adheres to each of the individual raisins regardless of the severity and duration of such mechanical shaking. If desired, the raisins may be rinsed at this stage and when so rinsed still retain the desirable surface characteristics believed to result from the imperceptible surface film. In any event, when the raisins leave the shaker they are substantially devoid of all surface moisture or have such surface moisture removed by any suitable means before packaging, storage, or subsequent treatment. It is to be understood that at this point, the raisins, or other dried fruit treated by immersion in the aqueous silicone bath, are ready for marketing and, as will hereinafter be more fully apparent, are markedly superior to untreated raisins or other dried fruit or those which have been treated by any other known process.

When it is desired to comminute the raisins or other dried fruits, a receiving chute 50 is disposed below the discharge end 47 of the separator 40 and is adapted to receive the treated raisins discharged therefrom. A supply hopper 51 is supported on the frame 11 in a superior position relative to the chute 50 and is provided with a depending delivery tube 52 affording a discharge orifice 53. A metering impeller 54 is disposed internally of the hopper 51 and mounted for rotation by a pulley 55 about which the third belt 33 is trained. Accordingly, during rotation of the drive motor 31, a predetermined quantity of dry, pulverulent material 56 is delivered from the hopper 51 by the impeller 54 and discharged from the orifice 53. The material 56 is selected primarily because of its anti-adhesive characteristics and its ability to be air borne in dust form so as to facilitate subsequent comminution of the raisins into particles, as well as to prevent adherence of the particles to each other and to the comminuting means. Examples of anti-adhesive materials suitable for use with raisins are cornstarch, powdered chocolate, and powdered cane sugar, cornstarch being preferred in most instances. Since food products, such as raisins and other dried fruits, are classified as carbohydrates, it is preferable to employ a suitable carbohydrate in a dry pulverulent form and of a particle size so as to provide an air borne dust within a comminution mill, generally indicated at 60. The various starches and sugars of the polysaccharide group satisfy the physical requirements of the material 56, so as to provide such air borne dust.

Figure 2:
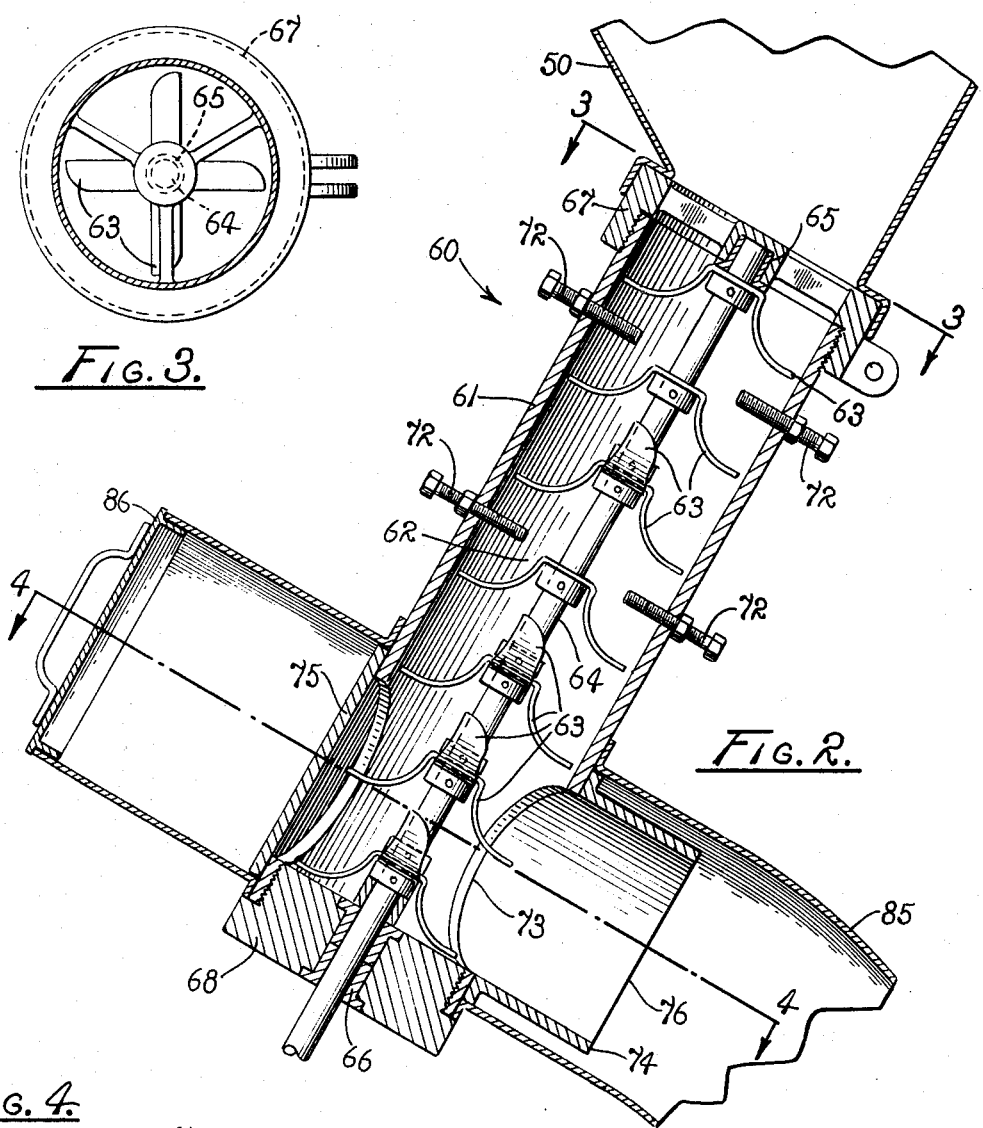
FIG. 2 is an enlarged fragmentary view in vertical, longitudinal section, showing structural details of a comminution mill of the apparatus of FIG. 1.

The mill 60 is disposed in receiving relationship to the receiving chute 50, and, as can be seen in FIG. 2, provides a generally tubular housing 61. The housing defines an internal dusting chamber 62 in which are mounted axially spaced circumferentially arranged chopping blades 63 supported on an elongated shaft 64. The shaft is mounted internally of the housing for rotation therein by means of upper and lower bearings 65 and 66. The upper bearing is supported in an annular cap 67 screw-threadably secured to the upper end of the housing 61. In like manner, a lower bearing support 68 is screw-threadably secured to the housing and closes the lower end thereof. Accordingly, the tubular housing 61 in conjunction with the lower bearing support 68 defines the internal dusting chamber 62.

The comminution mill 60 is supported on the frame 11 by means of upper and lower brackets 70 and 71 in a manner to incline the axis of the shaft 64. The angle of inclination is selected so that the chopping blades 63, during rotation of the shaft 64, alternately are submerged in the dry pulverulent material 56 within the dusting chamber 61 and subsequently lifted free from such material resting at the lower end of the chamber. A plurality of elongated threaded members, such as the capscrews 72, are preferably screw-threadably mounted in the tubular housing 61 so as to be adjustable radially thereof and to exert a control over the rate of axial movement of the raisins 22 and the pulverulent material 56 through the mill 60.

Figure 4:
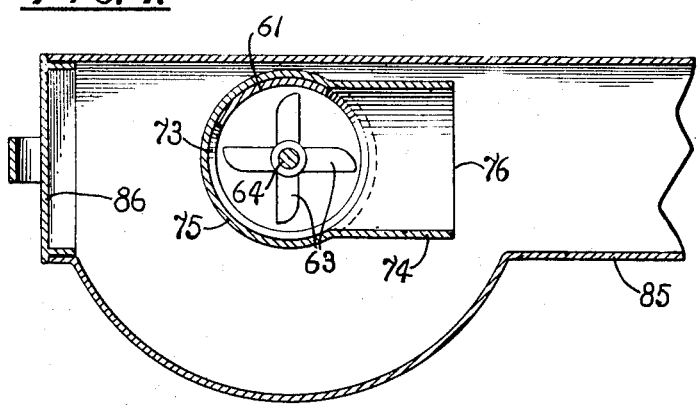
FIG. 4 is a reduced-scale, transverse section taken on line 4—4 of FIG. 2.

The depth of residual material, including comminuted raisin particles, remaining within the chamber 61 is also selectively adjusted prior to its gravitational movement through a semi-circular discharge opening 73 at the lower end of the housing 61. An adjustable flow control tube 74 is mounted on an annular collar 75 and provides an outlet 76 in communication with the semi-circular discharge opening 73. As can be seen in FIGS. 1 and 4, selective circumferential positioning of the collar 75 determines the elevation of the outlet 76 in relation to the lower end of the chamber 62 and consequently permits selective adjustment of the depth of residual material therewithin and as a result the extent of comminution. Obviously, the longer dried fruits are subjected to the action of the blades the smaller they are comminuted. By appropriate positioning of the flow control tube 74, the mill 60 can achieve a range of particle size from almost whole raisins to minute particles approaching a paste-like consistency. Regardless of the particle size, the anti-adhesive material, such as cornstarch, as an air borne dust provides a chopping environment which facilitates comminution, prevents adherence of the particles to the blade 63 as well as to each other, and achieves a substantially free-flowing end product discharged from the outlet 76.

To provide the drive for such comminution, a motor 80 is supported on the lower bracket 71 and arranged in driving relationship to the shaft 64 by means of a coupling 81.

A tubular transfer chute 85 encompasses the mill 60 at the discharge opening 73 and is adapted to receive particles of comminuted raisins and intermixed with the anti-adhesive material 56 discharged from the outlet 76. A circular plate 86 releasably covers an inspection port provided in the chute 85. The chute terminates in a lower discharge opening 87 and gravitationally deposits that mixture of comminuted raisins and anti-adhesive material on a conveyor, generally indicated at 88. The conveyor also includes means, not shown, for separating such comminuted particles from the anti-adhesive material and recovery thereof. For reasons not fully understood, the pretreatment of the raisins in the aqueous silicone bath greatly facilitates their comminuting in the dust environment with a minimum of adherence of particles to the blades and to each other and recovery of the cornstarch or the like for re-use with only a slight amount remaining on the end product.

*Operation*

As schematically illustrated in the flow sheet of FIG. 5, dried fruits, such as raisins, are subjected to a cleansing and treatment in the aqueous bath 12, which concomitantly removes surface impurities therefrom as well as provides an imperceptible protective film about each of the raisins. In the event that such surface impurity is in the nature of a mold and the skin of the so-affected raisins has been punctured or partially destroyed, the protective film afforded by the silicone acts as a barrier so as to minimize surface stickiness. In addition, whole raisins are provided with such a film which thereby enhances their flowability and facilitates subsequent comminution when so treated.

Preferably, the bath is a concentration of approximately three parts per million of silicone additive and the raisins are motivated through the bath so as to achieve a time-temperature relationship of from approximately 5 seconds at a temperature of 160° F. to 240 seconds at a temperature of 80° F. Satisfactory results have been achieved with only gentle agitation of the raisins through a bath so constituted and maintained.

Following treatment of the raisins in the aqueous bath, the treated raisins proceed to the separator 40 where residual portions of the bath are removed. Liquid removed therefrom is preferably recovered and returned to the bath. The raisins or other dried fruit are then ready for market.

If a comminuted end product is desired, the pre-treated raisins are conveyed to the comminution mill 60 which includes the described dusting chamber. The chamber is provided with a controlled atmosphere containing air borne particles of an anti-adhesive powdered material, such as cornstarch. Comminution in such a controlled atmosphere continues until a desired particle size is achieved. The pre-treatment by the aqueous cleansing bath and protective film resulting therefrom and the anti-adhesive material in the form of the cornstarch both individually and conjointly enhance the comminution of the raisins and maintain the resulting particles in discrete and separate fragments.

Following comminution, the mixture of particles and cornstarch proceeds to a separator whereby the cornstarch is recovered by removal of substantially all thereof from the discrete particles. The comminuted raisins are subsequently graded and sorted as to particle size, if desired.

The flow sheet of FIG. 6 illustrates selectively variable aspects of the present invention. Under certain circumstances, the mold adhering to raisins is of such tenacious character that a mechanical cleaning device schematically illustrated at 90 is employed to remove such tenacious mold. Mechanical cleaners intended for this purpose are available in a variety of forms well-known to those skilled in the art, and are generically designated as recleaners. Generally, the include some type of shaking device such as the rotatably mounted agitator 91. The raisins are tumbled and agitated in the cleaner 90 for a period of time sufficient to dislodge all of such mold. The resulting cleansed raisins are individually provided with the imperceptible protective film afforded by the silicone. Even those surface areas of the raisins on which the skin has been punctured or partially destroyed, the silicone additive penetrates the mold prior to removal and forms a film over such areas. Accordingly, the silicone performs a two-fold function in assisting in the loosening of the mold as well as providing a protective film for the cleansed raisins. Following such cleansing, the raisins or other dried fruit are then ready for market.

If a paste-type end product is desired, the cleansed raisins are then conveyed to a grinder indicated at 100. A dashed alternative path is indicated at 101 in the flow sheet in the event that the character of the surface impurities are such that they can be completely removed by the aqueous cleansing bath 12. Accordingly, in most instances, there is no need to employ the mechanical cleaner 90, except in the case of tenacious molds.

The treated fruit is further processed in the grinder 100 to reduce the whole units to a smooth food product of paste-like physical characteristics, and referred to as raisin paste. Due to the lubricity imparted to the raisins by the silicone additive of the bath 12, the raisin paste is discharged from the grinder without causing undesirable accumulation of adherent particles thereto. Prior to the present invention, grinding of raisins to a paste presented almost insurmountable problems of adherence of the raisin flesh to the grinder. In addition, previously known raisin pastes were susceptible to dehydration and solidification in a brick-like form. In contrast to such previously known raisin pastes, raisins treated by the process of the present invention, when subsequently ground to a paste, produce a smooth paste capable of retaining the natural moisture of the raisins or any moisture added to facilitate the formation of a paste. Even when stored over an extended period of time, the paste still retains such moisture and remains in a desirable plastic condition.

The comminution of the fruit as described in connection with the flow sheet of FIG. 5 is also selectively performed following any required removal of tenacious mold by the mechanical cleaner 90. As illustrated by the alternative path of movement 105 in the flow sheet of FIG. 6, raisins cleansed in the bath 12 proceed directly from the separator to a recovery point for whole fruit, if such raisins are not covered with tenacious mold requiring removal by the cleaner 90. If comminuted raisins are desired, the raisins continue along a path indicated at 106 to the comminution mill 60. Comminution is performed in the previously described atmosphere containing an anti-adherent powder, as described in connection with FIG. 5, until the desired particle size is effected. The comminuted fruit is then graded and sorted as to particle size, as described above.

Accordingly, the present invention provides a process of preparing dried fruit products in a form heretofore not feasible on a commercial scale. The process includes a cleansing aqueous bath treatment which is highly effective in removing surface impurities from food products as well as conditioning them for subsequent storage, marketing, handling or comminution. The invention also permits the production of comminuted dried fruits not previously susceptible to comminution on a commercial scale. Regardless of the particle size of the comminuted dried fruit, the anti-adhesive powder both independently of and conjointly with the bath treatment, prevents adherence of the individual particles to each other and the comminution means employed.

While the instant invention is described in terms of particular ingredients, and ranges thereof, to be used, it is obvious that many modifications and variations in the nature and proportions of the ingredients may be made without departing from the spirit and scope of the invention, and only such limitations should be imposed as are indicated in the appended claims.

Having described my invention, what I claim as new and desire to secure by Letters Patent is:

1. A process for preparing dried fruit for market comprising immersing the dried fruit in an aqueous bath consisting essentially of water and an additive of a water soluble material selected from the group of organo-silicon oxide polymers present in the bath in an amount of substantially between 1 to 33.3 parts per million by weight, agitating the products while in the bath sufficiently to dislodge surface impurities therefrom, removing the products from the bath, and removing surface moisture from the dried fruit with an imperceptible film of said selected material adherent thereto as a barrier to subsequent contamination and loss of internal moisture.

2. The process of claim 1 wherein said additive material is water dilutable silicone resin.

3. A process of preparing dried fruit for market comprising immersing the dried fruit in an aqueous bath consisting essentially of water and an additive selected from the group of water soluble organo-silicon oxide polymers in a concentration of substantially at least between 1 part and 33.3 parts per million and at a time and temperature relationship of from approximately 5 seconds at a temperature of 160° F. to 240 seconds at a temperature of 80° F.

4. A dried fruit treating process as claimed in claim 3 and removing the dried fruit from the bath, rinsing the dried fruit with water after removal from the bath, and removing surface moisture from the fruit after it has been rinsed while leaving an imperceptible film of organo-silicon oxide polymers on the dried fruit as a barrier to subsequent contamination and loss of internal moisture.

5. In the processing of dried fruit for ultimate consumption by humans and/or animals, the process comprising treating the dried fruit by immersion in an aqueous bath consisting essentially of water and an additive of a water soluble material selected from the group of organo-silicon oxide polymers present in the bath in an amount of substantially between 1 to 33.3 parts per million by weight, to remove surface impurities therefrom and to impart an imperceptible film of organo-silicon oxide polymers thereto, removing the products from the bath, removing surface moisture of the bath from the treated products, and comminuting the treated products to reduce them to discrete particles in an environment of air borne anti-adhesive material.

6. A dried fruit treating process comprising the steps of treating the dried fruit by immersion in an aqueous bath consisting essentially of water and an additive of a water soluble material selected from the group of organo-silicon oxide polymers present in the bath in an amount of substantially between 1 to 33.3 parts per million by weight, to remove surface impurities therefrom and to impart a film of organo-silicon oxide polymers thereto, removing the fruit from the bath, removing surface moisture of the bath from the treated fruit, and comminuting the treated fruit in a protective atmosphere containing air borne particles of an anti-adhesive, dry, pulverulent carbohydrate material.

7. The process of claim 6 wherein said carbohydrate material is cornstarch.

8. A process comprising treating dried fruit by immersion in an aqueous bath consisting essentially of water and an additive of a water soluble material selected from the group of organo-silicon oxide polymers present in the bath in an amount of substantially between 1 to 33.3 parts per million by weight, to remove surface impurities from the fruit and to impart an imperceptible film of organo-silicon oxide polymers thereto, removing the fruit from the bath, removing surface moisture of the bath from the treated fruit, and comminuting the treated fruit to reduce it to discrete particles in a protective atmosphere containing an air borne anti-adhesive, dry, pulverulent material in sufficient quantity substantially to prevent adhesion of said fruit particles to comminuting means and to other fruit particles during and following said comminuting.

9. The process of claim 8 wherein said adhesion prevention material is a pulverulent polysaccharide.

10. The process of claim 9 wherein said polysaccharide is a starch.

11. The process of claim 8 in which the pulverulent material is cornstarch.

12. A process comprising the steps of agitating raisins in an aqueous bath to remove surface impurities therefrom, the bath consisting essentially of water and an additive of a water soluble material selected from the group of organo-silicon oxide polymers present in the bath in an amount of substantially between 1 to 33.3 parts per million by weight, and at a time and temperature relationship of from approximately 5 seconds at a temperature of 160° F. to 240 seconds at a temperature of 80° F., removing the treated raisins from said bath, removing surface moisture of the bath from the treated raisins, and comminuting the raisins in an environment of air borne cornstarch.

13. The process which comprises immersing dried fruit which initially has surface deposits of sugar in an aqueous bath consisting essentially of water and an additive of water soluble material selected from the group of organo-silicon oxide polymers present in the bath in an amount of substantially between 1 to 33.3 parts per million by weight, whereby a substantially imperceptible film of the organo-silicon oxide polymers is deposited thereon, and removing surface moisture from the food with said film remaining as a barrier to subsequent contamination and loss of internal moisture.

References Cited

UNITED STATES PATENTS

| 2,703,288 | 3/1955 | Worson | 99—222 |
| 2,909,435 | 10/1959 | Watters | 99—168 |
| 2,984,572 | 5/1961 | Barsel | 99—168 |

HYMAN LORD, *Acting Primary Examiner.*

RAYMOND N. JONES, A. LOUIS MONACELL,
*Examiners.*

M. VOET, *Assistant Examiner.*